(12) United States Patent
Takeuchi et al.

(10) Patent No.: US 9,580,821 B2
(45) Date of Patent: Feb. 28, 2017

(54) CONTROL METHOD OF DIFFERENTIAL PRESSURE WATER ELECTROLYSIS SYSTEM

(71) Applicant: HONDA MOTOR CO., LTD., Tokyo (JP)

(72) Inventors: Jun Takeuchi, Wako (JP); Akihiro Noda, Wako (JP); Yuji Yamakawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 259 days.

(21) Appl. No.: 14/469,584

(22) Filed: Aug. 27, 2014

(65) Prior Publication Data

US 2015/0060293 A1 Mar. 5, 2015

(30) Foreign Application Priority Data

Aug. 30, 2013 (JP) ................................. 2013-180643

(51) Int. Cl.
 *C25B 1/12* (2006.01)
 *C25B 15/02* (2006.01)
(52) U.S. Cl.
 CPC ................ *C25B 1/12* (2013.01); *C25B 15/02* (2013.01); *Y02E 60/366* (2013.01)

(58) Field of Classification Search
 CPC .......... C25B 15/02; C25B 1/12; Y02E 60/366
 See application file for complete search history.

(56) References Cited

U.S. PATENT DOCUMENTS

2012/0255868 A1* 10/2012 Takeuchi .................. C25B 1/12
 205/628

FOREIGN PATENT DOCUMENTS

JP 2010-236089 10/2010

* cited by examiner

*Primary Examiner* — Keith Hendricks
*Assistant Examiner* — Salil Jain
(74) *Attorney, Agent, or Firm* — Mori & Ward, LLP (57) ABSTRACT

In a control method of a differential pressure water electrolysis system, a reference water level of a gas-liquid separator for normal operations is set to discharge a liquid water stored in the gas-liquid separator to a discharge tube. A depressurization reference water level which is a lower water level than the reference water level is set to discharge the liquid water stored in the gas-liquid separator to the discharge tube upon depressurizing. A depressurization valve is opened to reduce pressure at a cathode side after operation of a differential pressure water electrolysis device has been stopped, in a state with voltage applied. A permissible water level upper limit value at which an open/close valve is opened is switched from the reference water level to the depressurization reference water level when the depressurization valve is opened.

9 Claims, 6 Drawing Sheets

CONTROL METHOD OF DIFFERENTIAL PRESSURE WATER ELECTROLYSIS SYSTEM

CROSS-REFERENCE TO RELATED APPLICATIONS

The present application claims priority under 35 U.S.C. §119 to Japanese Patent Application No. 2013-180643, filed Aug. 30, 2013, entitled "Control Method of Differential Pressure Water Electrolysis System." The contents of this application are incorporated herein by reference in their entirety.

BACKGROUND

1. Field

The present disclosure relates to a control method of a differential pressure water electrolysis system.

2. Description of the Related Art

Generally, hydrogen is used as a fuel gas employed in power generating reaction in fuel cells. Hydrogen is produced by a water electrolysis device, for example. Water electrolysis devices use a solid polymer electrolyte membrane (ion-exchange membrane) to perform electrolysis of water and generate hydrogen (as well as oxygen). Both sides of a solid polymer electrolyte membrane are formed of an electrode catalyst, forming an electrolyte membrane-electrode structure. Feed conductors are provided to either side of the electrolyte membrane-electrode structure, making up a unit cell.

Multiple unit cells are laminated to form a cell unit. Voltage is applied to both ends of the cell unit in the laminar direction, and water is supplied to the anode side feed conductor. Accordingly, water electrolysis was performed at the anode side of the electrolyte membrane-electrode structure, by which hydrogen ions (protons) are generated, the hydrogen ions transmit through the solid polymer electrolyte membrane and migrate to the cathode side and bind to electrons, thereby producing hydrogen.

Hydrogen derived from a cell unit is sent to a gas-liquid separator where liquid water is removed, and then supplied to a hydrogen purification unit, thereby yielding the product hydrogen (dry hydrogen). On the other hand, at the anode side, the oxygen generated together with the hydrogen is discharged from the cell unit along with excess water.

A differential pressure water electrolysis device (high-pressure hydrogen production device) is a type of water hydrolysis device where oxygen is generated at ambient pressure at the anode side, while high-pressure (generally 1 MPa or higher) hydrogen is generated at the cathode side. The differential pressure water electrolysis device at this time has high-pressure hydrogen filled in a channel of a cathode-side separator, and ambient-pressure water and oxygen in a channel of an anode-side separator, across the solid polymer membrane. Thus, when stopping operation (ending supply of generated hydrogen), hydrogen remaining at the cathode side may cross-leak to the anode side, so the pressure difference on the two sides of the solid polymer membrane needs to be removed to protect the solid polymer membrane.

Japanese Unexamined Patent Application Publication No. 2010-236089 discloses a method of stopping operation of a water electrolysis device. This operation stopping method includes a process to apply voltage after supply of oxygen from the cathode side has been stopped, and a process to depressurize (release pressure) at the cathode side at least, with the voltage applied. According to this arrangement, if hydrogen at the cathode side leaks to the anode side, the hydrogen becomes protons again due to the applied voltage, transmits the electrolyte membrane by the hydrogen film pump effect and return to the cathode side.

Accordingly, retention of high-pressure hydrogen which has leaked to the anode side can be suppressed after ending operation, thereby preventing reduction (deterioration) of the catalyst electrodes by the hydrogen.

SUMMARY

According to one aspect of the present invention, a control method of a differential pressure water electrolysis system includes a water level setting process, a depressurizing process, and a switching process. The differential pressure water electrolysis system includes a differential pressure water electrolysis device, a gas-liquid separator, a pressure loss part, an open/close valve, and a depressurization valve. The differential pressure water electrolysis device is configured to perform electrolysis of water and generate oxygen at the anode side, while generating hydrogen at the cathode side at a higher pressure than the oxygen. The gas-liquid separator is configured to perform gas-liquid separation of hydrogen derived from the differential pressure water electrolysis device. The pressure loss part is disposed on a discharge tube to discharge liquid water stored in the gas-liquid separator. The pressure loss part causes a set amount of the liquid water to flow by providing pressure loss. The open/close valve is to open and close the discharge tube. The depressurization valve is provided on a depressurizing tube to reduce pressure at the cathode side of the differential pressure water electrolysis device. The depressurization valve is opened when depressurizing. In the water level setting process, a reference water level of the gas-liquid separator is set for normal operations to discharge the liquid water stored in the gas-liquid separator to the discharge tube, and a depressurization reference water level which is a lower water level than the reference water level is set when depressurizing, to discharge the liquid water stored in the gas-liquid separator to the discharge tube. In the depressurizing process, the depressurization valve is opened and pressure at the cathode side is reduced after operation of the differential pressure water electrolysis device has been stopped, in a state with voltage applied. In the switching process, a permissible water level upper limit value, at which the open/close valve is opened, is switched from the reference water level to the depressurization reference water level when the depressurizing process is started.

According to another aspect of the present invention, in a control method of a differential pressure water electrolysis system, the differential pressure water electrolysis system includes a differential pressure water electrolysis device, a gas-liquid separator, a pressure loss part, an open/close valve, and a depressurization valve. The differential pressure water electrolysis device is configured to perform electrolysis of water and generate oxygen at the anode side, while generating hydrogen at the cathode side at a higher pressure than the oxygen. The gas-liquid separator is configured to perform gas-liquid separation of hydrogen derived from the differential pressure water electrolysis device. The pressure loss part is disposed on a discharge tube to discharge liquid water stored in the gas-liquid separator and causes a set amount of the liquid water to flow by providing pressure loss. The open/close valve is to open and close the discharge tube. The depressurization valve is provided on a depressurizing tube to reduce pressure at the cathode side of the differential pressure water electrolysis device. The depressurization valve is opened when depressurizing. A reference water level of the gas-liquid separator for normal operations is set to discharge the liquid water stored in the gas-liquid separator to the discharge tube. A depressurization reference water level which is a lower water level than the reference water level is set to discharge the liquid water stored in the gas-liquid separator to the discharge tube upon depressurizing. The depressurization valve is opened to reduce pressure at the cathode side after operation of the differential pressure water electrolysis device has been stopped, in a state with voltage applied. A permissible water level upper limit value at which the open/close valve is opened is switched from the reference water level to the depressurization reference water level when the depressurization valve is opened.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
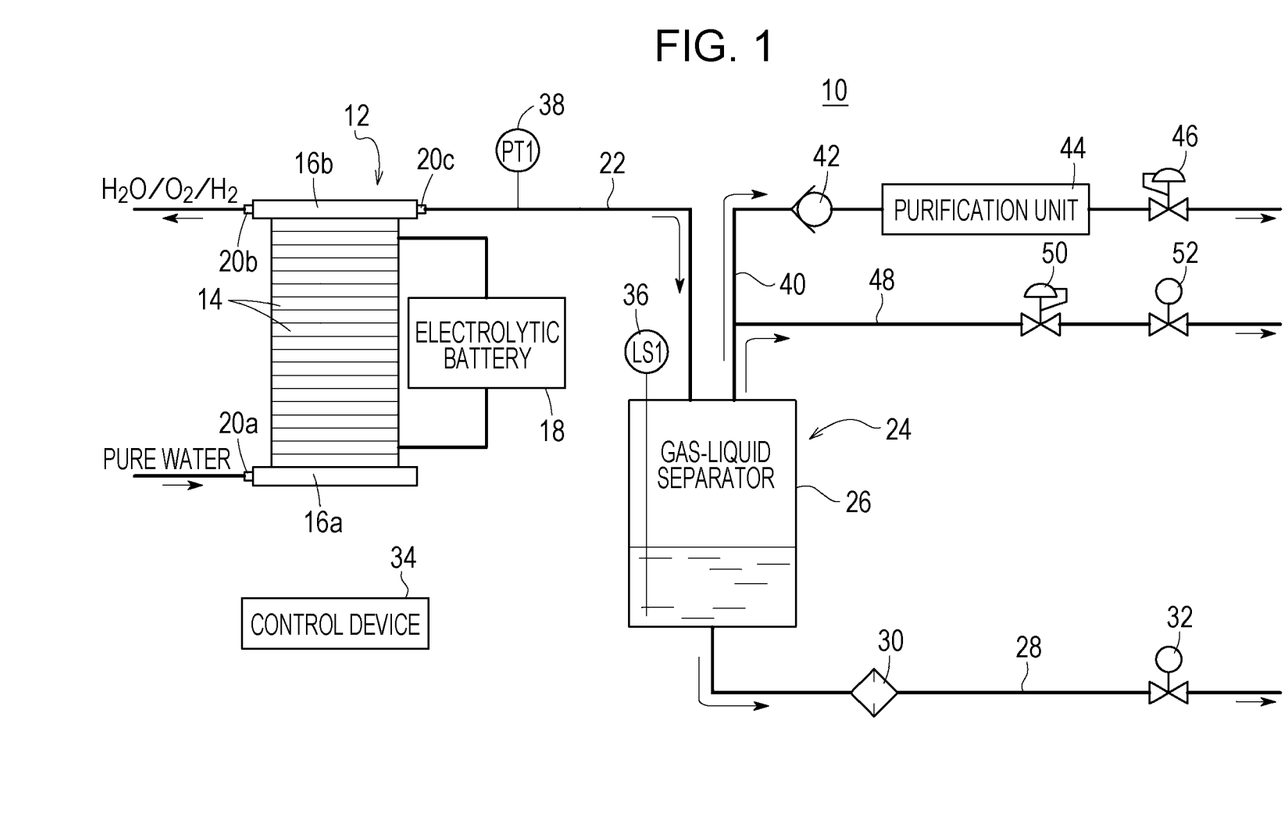
FIG. 1 is a schematic configuration explanatory diagram of a differential pressure water electrolysis system to which a control method according to an embodiment of the present disclosure is applied.

FIG. 1 illustrates a differential pressure water electrolysis system 10 to which a control method according to an embodiment of the present disclosure is applied. The differential pressure water electrolysis system 10 includes a differential pressure water electrolysis device 12 which produces oxygen and high-pressure hydrogen by preforming electrolysis of water (pure water). High-pressure hydrogen refers to hydrogen having a higher pressure than the ambient-pressure oxygen, 1 MPa to 70 MPa, for example.

Multiple water electrolysis cells (unit cells) 14 are laminated in the differential pressure water electrolysis device 12, and end plates 16a and 16b are disposed on either side of the water electrolysis cells 14 in the laminar direction. An electrolysis power supply 18 which is an AC power source is connected to the differential pressure water electrolysis device 12. The water electrolysis cells 14 are each provided with an anode side electrode catalyst layer and cathode side electrode catalyst layer on either side of a solid polymer electrolyte membrane.

A water supply tube 20a is connected to the end plate 16a. A water discharge tube 20b and hydrogen tube 20c are connected to the end plate 16b. Pure water is supplied to the water supply tube 20a, and oxygen generated by reaction (and hydrogen which has passed through) and unreacted water are discharged from the water discharge tube 20b.

One end of a hydrogen guide tube 22 is connected to the hydrogen tube 20c, and the other end of the hydrogen guide tube 22 is connected to a tank unit 26 making up a gas-liquid separator 24. The tank unit 26 stores moisture (liquid) included in the hydrogen, and a discharge tube 28 to discharge water separated form the hydrogen is connected to the base of the tank unit 26.

The discharge tube 28 is provided with a pressure loss part which causes a set amount of liquid water to flow by providing pressure loss, an orifice 30 for example. A fine tube, for example, may be used instead of the orifice 30. An open/close valve, such as an electromagnetic valve 32 for example, is provided to the discharge tube 28 downstream of the orifice 30. The electromagnetic valve 32 is driven between open and closed by a control device 34.

The tank unit 26 includes a water level detecting unit, a water level detection sensor 36 for example, to detect whether or not the water level WS is at the set level. Detection signals of the water level detection sensor 36 are input to the control device 34. The hydrogen guide tube 22 is provided with a pressure gauge 38 for example. The detection signals of the pressure gauge 38 are input to the control device 34.

One end of a delivery tube 40 which outputs the hydrogen from which water has been removed, is connected to the tank unit 26. The delivery tube 40 has a check valve 42, purification unit 44, and back-pressure valve 46 disposed thereupon, in that order toward the downstream side. The purification unit 44 has a cooling mechanism and water adsorption mechanism. The water adsorption mechanism adsorbs water vapor (moisture) included in the hydrogen. The product hydrogen (dry hydrogen) output from the purification unit 44 is pressurized to a stipulated pressure (e.g., 35 MPa) at the back-pressure valve 46, and is supplied to a fuel cell electrical vehicle (not illustrated).

A depressurizing tube 48 branches from the delivery tube 40. The depressurizing tube 48 is provided with a pressure reduction valve 50 and a depressurization valve 52. The depressurization valve 52 is an electromagnetic valve for example, and is driven open/closed by the control device 34. An arrangement may be made where the depressurizing tube 48 branches from partway along the hydrogen guide tube 22 instead of the delivery tube 40.

Operations of the differential pressure water electrolysis system 10 configured thus will be described below.

When starting the differential pressure water electrolysis system 10, first, pure water generated from tap water, for example, is supplied to the water supply tube 20a of the differential pressure water electrolysis device 12. On the other hand, electrolysis voltage is applied by the electrolysis power supply 18 electrically connected to the differential pressure water electrolysis device 12.

Accordingly, water supplied to the anode side is broken down by the electricity at the water electrolysis cells 14, thereby generating hydrogen ions, electrons, and oxygen. The hydrogen ions generated by this anodic reaction transmit through the solid polymer electrolyte membrane and migrate to the cathode side and bind to electrons, thereby producing hydrogen. Accordingly, the hydrogen generated at the cathode side can be externally extracted from the differential pressure water electrolysis device 12 by way of the hydrogen guide tube 22 connected to the hydrogen tube 20c.

On the other hand, there is a mixed flow of the oxygen generated by the reaction (and hydrogen which has permeated thereto) and used water at the anode side, which is discharged from the water discharge tube 20b. This used water is separated from the oxygen (and hydrogen which has permeated thereto) and fed to the water supply tube 20a.

The hydrogen generated within the differential pressure water electrolysis device 12 is fed to the gas-liquid separator 24 via the hydrogen guide tube 22. Liquid water contained in the hydrogen is separated from the hydrogen at the gas-liquid separator 24. The water level WS of the liquid water stored in the tank unit 26 is detected by the water level detection sensor 36.

The control device 34 has set a control upper limit water level WS (high) serving as a water level threshold at which water needs to be discharged from the tank unit 26, and a control lower limit water level WS (low) serving as a water level threshold at which discharge of water from the tank unit 26 needs to be stopped.

Upon the water level detection sensor 36 detecting the control upper limit water level WS (high), the control device 34 opens the electromagnetic valve 32. Accordingly, the water within the tank unit 26 is discharged to the discharge tube 28 at a constant flow by the orifice 30. Subsequently, upon detection that the water level WS within the tank unit 26 has dropped to the control lower limit water level WS (low), the electromagnetic valve 32 is closed.

On the other hand, the hydrogen is fed to the delivery tube 40, and supplied to the purification unit 44, which adsorbs water vapor (moisture) included in the hydrogen. The product hydrogen (dry hydrogen) output from the purification unit 44 is pressurized to a stipulated pressure (e.g., 35 MPa) at the back-pressure valve 46, and is supplied to a fuel cell electrical vehicle (not illustrated).

Next, the control method of the differential pressure water electrolysis system 10 according to the embodiment of the present disclosure will be described.

Upon completing supplying the fuel cell electrical vehicle, omitted from illustration, with the dry hydrogen, the control device 34 judges that operation of the differential pressure water electrolysis device 12 has stopped. A standard for judging that the operation has stopped may be an operation of turning off a switch, omitted from illustration, or some other method.

Next, electric current to apply for depressurization (reduction of pressure) is set. This applied current is set to a current value such that the hydrogen film pump effect is increased as to cross-leaking of hydrogen. Accordingly, the control device 34 controls the electrolysis power supply 18 so as to apply this current to the water electrolysis cells 14 making up the differential pressure water electrolysis device 12. Reduction in pressure of the high-pressure hydrogen at the cathode side is started in this state.

Specifically, the depressurization valve 52 is opened, so the inside of the tank unit 26 communicates with the depressurizing tube 48. Accordingly, the high-pressure hydrogen filling the cathode side is temporarily let into the tank unit 26 through the hydrogen guide tube 22, and pressure is gradually lowered from the depressurizing tube 48 under the operation of the pressure reduction valve 50. This pressure reduction processing is performed until the pressure at the cathode side is the same pressure as the pressure at the anode side (ambient pressure).

On the other hand, the electrolysis voltage is applied to the differential pressure water electrolysis device 12, so hydrogen is generated at the cathode side, and permeating water is generated from the anode side to the cathode side. This permeating water is let to the tank unit 26 through the hydrogen guide tube 22. Accordingly, the water level in the tank unit 26 rises.

Figure 2:
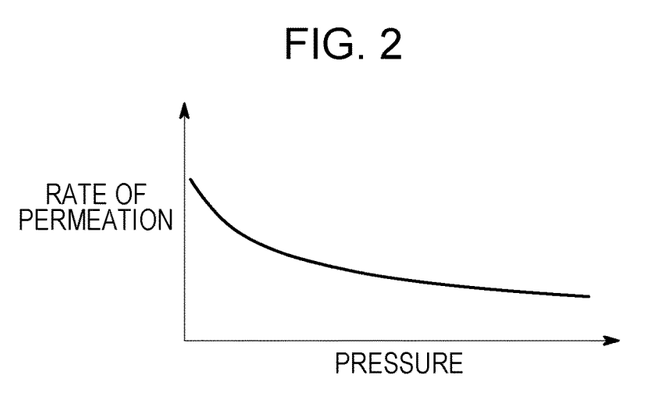
FIG. 2 is an explanatory diagram describing the relation between permeating water rate and pressure in a differential pressure water electrolysis device.
Figure 3:
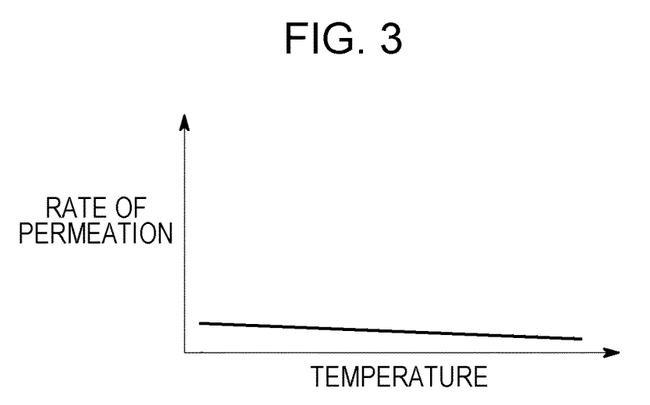
FIG. 3 is an explanatory diagram describing the relation between the permeating water rate and temperature.

Now, it should be noted that the rate of the permeating water generated at the cathode side is dependent on pressure, and tends to be lower the higher the pressure is, as illustrated in FIG. 2. Also, the rate of the permeating water is dependent on temperature, and tends to be lower the higher the temperature is, as illustrated in FIG. 3.

Figure 4:
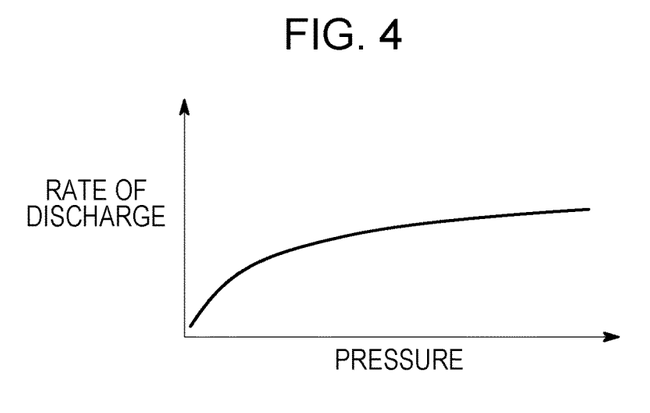
FIG. 4 is an explanatory diagram describing the relation between water discharge rate and pressure in a gas-liquid separator.
Figure 5:
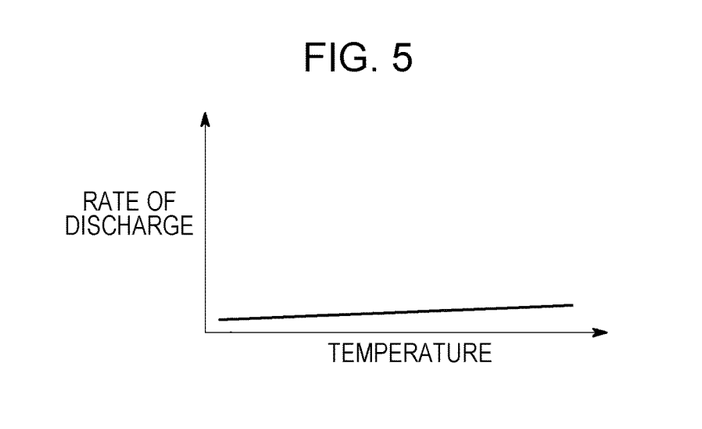
FIG. 5 is an explanatory diagram describing the relation between the water discharge rate and pressure.

Moreover, the discharge rate from the tank unit 26 to the discharge tube 28 is dependent on pressure and temperature. The rate of discharge tends to be higher the higher the pressure is, as illustrated in FIG. 4, and also tends to be higher the higher the temperature is, as illustrated in FIG. 5.

Thus, the higher the pressure is, the lower the rate of permeating water is, while on the other hand, the higher the pressure is, the faster the rate of discharge is. Accordingly, in a state where the pressure is relatively high, the rate of discharge at the tank unit 26 becomes higher than the rate of permeating water, so the water level WS drops due to the discharging processing. On the other hand, in a state where the pressure is relatively low, the rate of permeating water at the tank unit 26 becomes higher than the rate of discharge, so the water level WS rises due to the discharging processing. Thus, at the time of discharge there exists a water level fluctuation reversal pressure Pr which changes lowering of the water level WS to rising of the water level WS (see FIG. 6).

The water level fluctuation reversal pressure Pr also fluctuates depending on change in temperature. The rate of permeating water tends to be lower the higher the temperature is, and the rate of discharge tends to be higher the higher the temperature is. Accordingly, the higher the temperature is, the lower the water level fluctuation reversal pressure Pr within the tank unit 26 becomes, as illustrated in FIG. 7 as the relation between the rate of water level fluctuation (rate of discharge minus rate of permeation water) and water level fluctuation reversal pressure Pr.

Accordingly, performing discharge processing with the control upper limit water level WS (high) used in normal operation as a reference during depressurizations processing may cause the water to overflow the tank unit 26.

Figure 8:
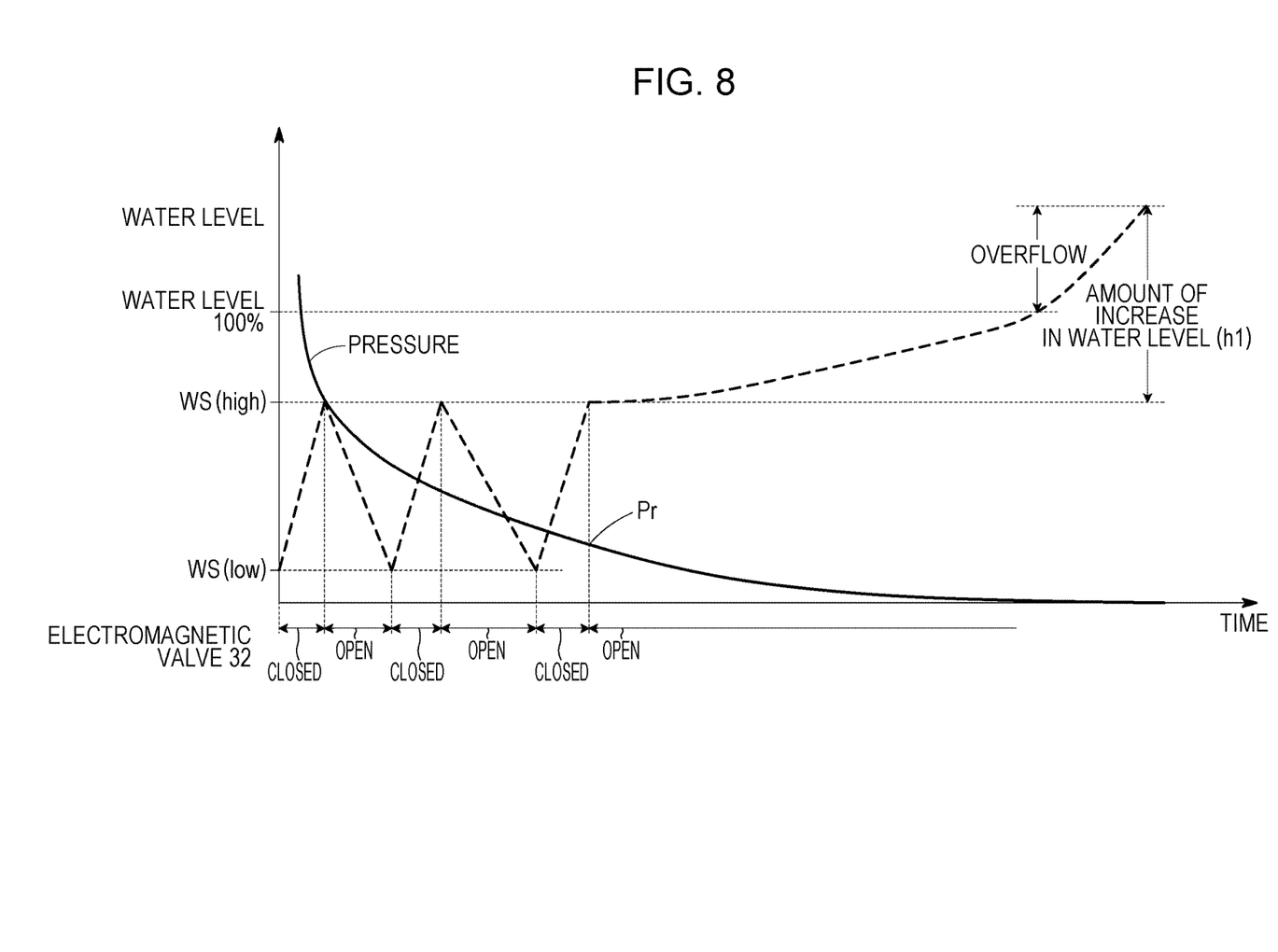
FIG. 8 is an explanatory diagram describing water level fluctuation when depressurizing under normal control.

Specifically, in a case where the pressure within the tank unit 26 has dropped below the water level fluctuation reversal pressure Pr as illustrated in FIG. 8, the water level WS within the tank unit 26 rises even if the electromagnetic valve 32 is kept open and discharge is performed nonstop, since the rate of permeating water is faster than the rate of discharge. The water level WS within the tank unit 26 finally exceeds the full water level (water level 100%), and water overflows the tank unit 26.

Figure 6:
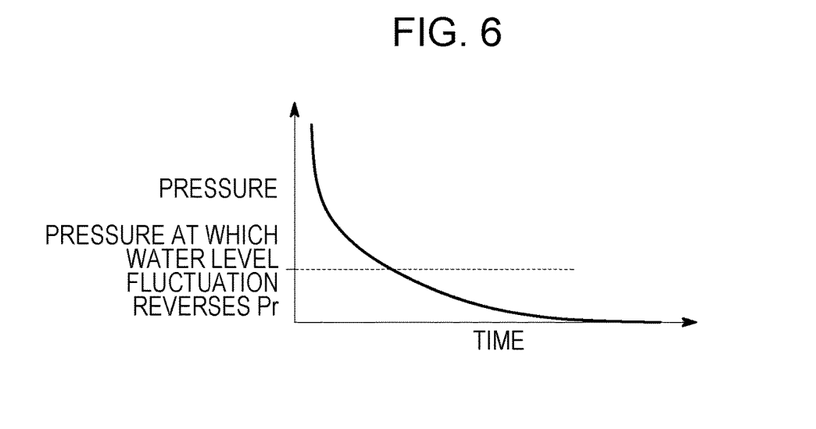
FIG. 6 is an explanatory diagram describing water level fluctuation reversal pressure within a tank.
Figure 7:
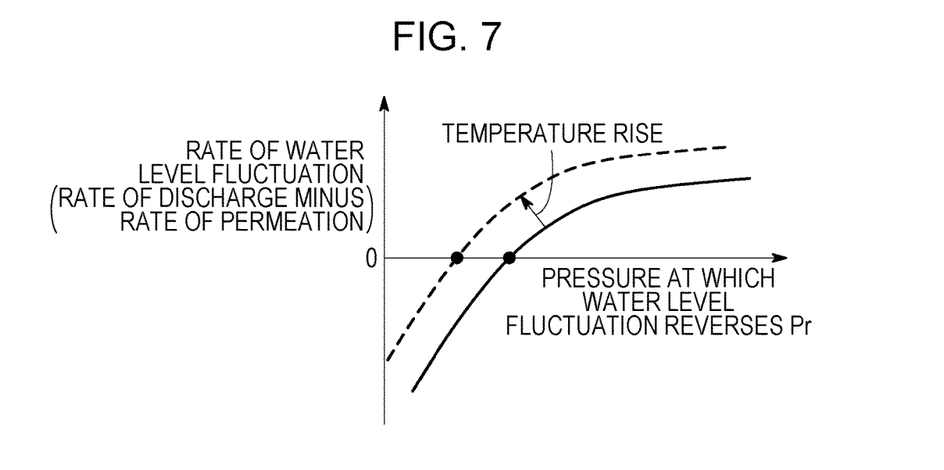
FIG. 7 is an explanatory diagram describing the relation between the water level fluctuation rate within a tank, and temperature.

A water level rise amount h1, which is the amount of rise during depressurization (amount of rise in water level during the depressurization process) is calculated by multiplying the time after the water level fluctuation reversal pressure Pr (the time up to the pressure at the cathode side and the pressure at the anode side becoming the same pressure) illustrated in FIG. 6 by the rate of water level fluctuation illustrated in FIG. 7. This is a process of comprehending the amount of rise when depressurizing.

Figure 9:
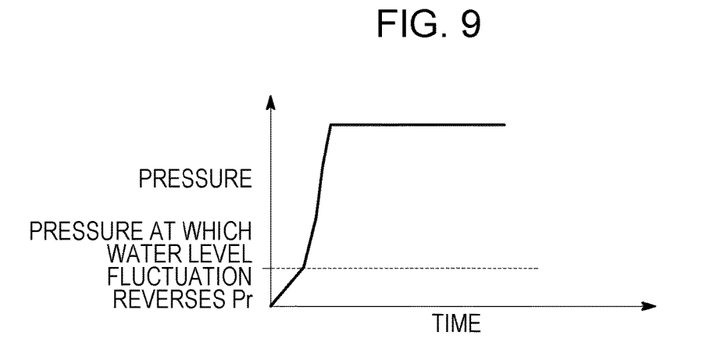
FIG. 9 is an explanatory diagram describing the relation between pressure and time when pressurizing.
Figure 10:
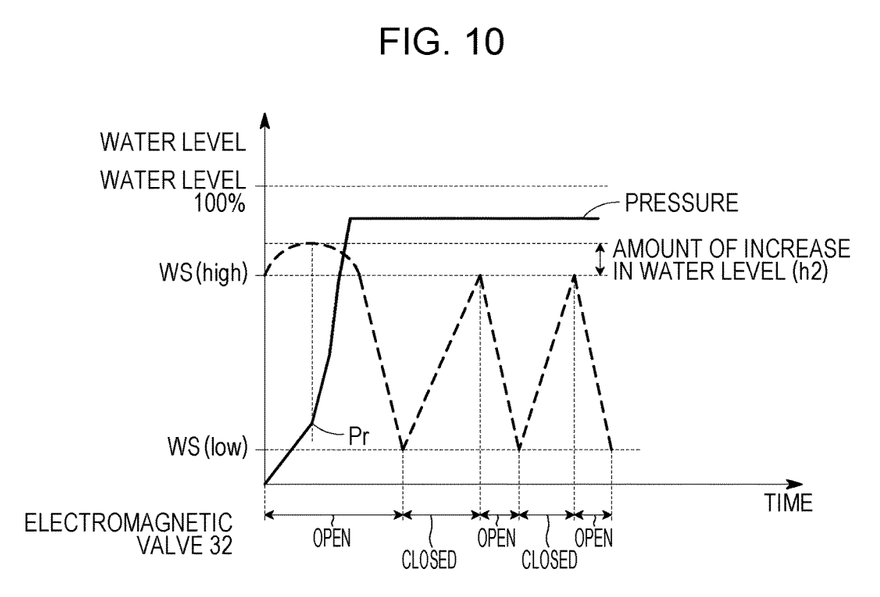
FIG. 10 is an explanatory diagram describing the relation between water discharge and water level when pressurizing.

On the other hand, pressure rises rapidly when pressurizing the differential pressure water electrolysis device 12, as illustrated in FIG. 9. At this time, the water level WS within the tank unit 26 rises until the water level fluctuation reversal pressure Pr is exceeded. Accordingly, until the pressure within the tank unit 26 reaches the water level fluctuation reversal pressure Pr, the water level WS continues to rise even though the electromagnetic valve 32 is in an open state, as illustrated in FIG. 10. A water level rise amount h2 which is the amount of rise at the time of pressurization (the amount of rise of water level during the pressurization process when starting operation) can be calculated in the same way as when depressurizing. This is a process of comprehending the amount of rise when pressurizing.

Figure 11:
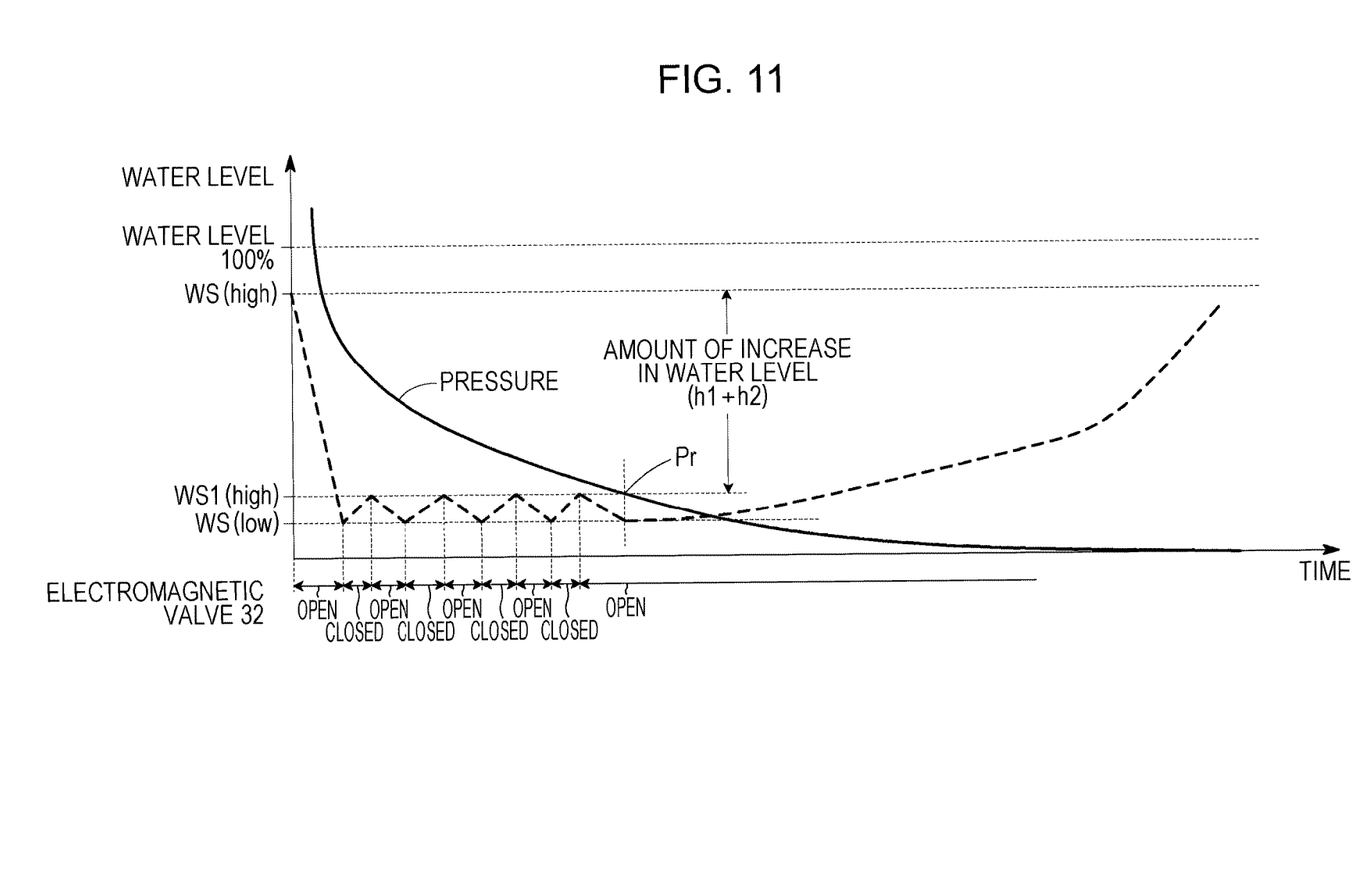
FIG. 11 is an explanatory diagram of control performed according to depressurization reference water level in the embodiment.

Accordingly, the present embodiment includes a process to switch the permissible water level upper limit value to open the electromagnetic valve 32 when the depressurization process is started, to a depressurization reference water level WS1 (high) which is lower than the reference water level, as illustrated in FIG. 11. Specifically, the control upper limit water level WS (high), which is the reference water level for normal operation, is switched to the depressurization reference water level WS1 (high).

The depressurization reference water level WS1 (high) is obtained by subtracting a value obtained by adding the water level rise amount h1 from the water level fluctuation reversal pressure Pr and the water level rise amount h2 when pressurizing, from the control upper limit water level WS (high). The depressurization reference water level WS1 (high) is preferably set to a value where overflow ultimately does not occur (or set smaller than a fail determination value). Moreover, the temperature at the time of depressurization is preferably comprehended (temperature comprehension process), so that the higher the temperature is, the higher the depressurization reference water level WS1 (high) is set.

In the present embodiment, the electrolysis power supply 18 is controlled at the time of stopping operation, so that the pressure at the cathode side is reduced while applying a lower voltage than the electrolysis voltage. Accordingly, upon hydrogen at the cathode side leaking to the anode side at this time, the hydrogen becomes protons again under the applied voltage, which are returned to the cathode side. This can suppress high-pressure hydrogen which has leaked to the anode side from filling the anode side after stopping operation, and thus prevent reduction (deterioration) of the catalyst electrodes due to this hydrogen.

Moreover, the depressurization process includes a water level switching process to switch the permissible water level upper limit value for opening the electromagnetic valve 32 to a depressurization reference water level WS1 (high) which is lower than the reference water level, as illustrated in FIG. 11. Specifically, the control upper limit water level WS (high), which is the reference water level for normal operation, is switched to the depressurization reference water level WS1 (high). Thus, even in a case where the pressure at the cathode side drops and the amount of permeating water to the tank unit 26 is greater than the amount of discharge from the tank unit 26, overflow of water from the tank unit 26 can be maximally suppressed.

Moreover, the depressurization reference water level WS1 (high) is set taking into consideration the water level rise amount h1 from the water level fluctuation reversal pressure Pr and the water level rise amount h2 when pressurizing. Moreover, the higher the temperature is, the higher the depressurization reference water level WS1 (high) is set. Accordingly, overflow of water from the tank unit 26 can be prevented in an even surer manner.

A differential pressure water electrolysis system to which the control method according to the present disclosure is applied, includes a differential pressure water electrolysis device, a gas-liquid separator, a pressure loss part, an open/close valve, and a depressurization valve. The differential pressure water electrolysis device performs electrolysis of water and generate oxygen at the anode side, while generating hydrogen at the cathode side at a higher pressure than the oxygen.

The gas-liquid separator performs gas-liquid separation of hydrogen derived from the differential pressure water electrolysis device. The pressure loss part is disposed on a discharge tube to discharge liquid water stored in the gas-liquid separator, and causes a set amount of the liquid water to flow by providing pressure loss. The open/close valve opens and closes the discharge tube, and the depressurization valve is provided on a depressurizing tube to reduce pressure at the cathode side of the differential pressure water electrolysis device, and is opened when depressurizing.

This control method includes a water level setting process, a depressurizing process, and a water level switching process. In the water level setting process, a reference water level of the gas-liquid separator is set for normal operations to discharge the liquid water stored in the gas-liquid separator to the discharge tube. On the other hand, a depressurization reference water level which is a lower water level than the reference water level is set when depressurizing, to discharge the liquid water stored in the gas-liquid separator to the discharge tube.

In the depressurizing process, the depressurization valve is opened to reduce pressure at the cathode side after operation of the differential pressure water electrolysis device has been stopped, in a state with voltage applied. In the water level switching process, a permissible water level upper limit value, at which the open/close valve is opened, is switched from the reference water level to the depressurization reference water level when the depressurizing process is started.

The control method may further include: a pressurizing process performed when starting operations; a depressurization rise amount comprehension process to comprehend beforehand a depressurization rise amount, which is a water level rise amount during the depressurizing process; and a pressurization rise amount comprehension process to comprehend beforehand a pressurization rise amount, which is a water level rise amount during the pressurizing process. In the water level switching process, a value obtained by subtracting the depressurization rise amount and pressurization rise amount from the reference water level may be set as the depressurization reference water level.

The control method may further include a temperature comprehension process to comprehend temperature when depressurizing, in which the higher the temperature is, the higher the depressurization reference water level is set.

In the above configurations, pressure at the cathode side is reduced while applying voltage when operation is stopped, so upon hydrogen of the cathode side leaking to the anode side, the hydrogen becomes protons again under the applied voltage, which are returned to the cathode side. This can suppress high-pressure hydrogen which has leaked to the anode side from filling the anode side after stopping operation, and thus prevent reduction (deterioration) of the catalyst electrodes due to this hydrogen.

Moreover, the depressurization process includes a water level switching process to switch the permissible water level upper limit value to a depressurization reference water level which is lower than the reference water level. Thus, even in a case where the pressure at the cathode side drops and the amount of permeating water to the cathode side is greater than the amount of discharge from the gas-liquid separator, overflow of liquid water from the gas-liquid separator can be maximally suppressed.

Obviously, numerous modifications and variations of the present invention are possible in light of the above teachings. It is therefore to be understood that within the scope of the appended claims, the invention may be practiced otherwise than as specifically described herein.

What is claimed is:

1. A control method of a differential pressure water electrolysis system during depressurizing, the differential pressure water electrolysis system including
    a differential pressure water electrolysis device configured to perform electrolysis of water and generate oxygen at the anode side, while generating hydrogen at the cathode side at a higher pressure than that of the oxygen,
    a gas-liquid separator configured to perform gas-liquid separation of hydrogen derived from the differential pressure water electrolysis device,
    a discharge tube to discharge liquid water stored in the gas-liquid separator,
    an open/close valve to open and close the discharge tube, and
    a depressurization valve provided on a depressurizing tube to reduce pressure at the cathode side of the differential pressure water electrolysis device, which is opened when depressurizing,
    the method comprising:
    setting a reference water level of the gas-liquid separator for normal operations at which the liquid water stored in the gas-liquid separator is discharged to the discharge tube;
    setting a depressurization reference water level, which is a lower water level than the reference water level, at which the liquid water stored in the gas-liquid separator is discharged to the discharge tube when depressurizing;
    opening the depressurization valve to reduce pressure at the cathode side after operation of the differential pressure water electrolysis device has been stopped; and
    switching a permissible water level upper limit value, at which the open/close valve is opened, from the reference water level to the depressurization reference water level when the depressurization valve is opened.

2. The control method according to claim 1, further comprising:
    closing the depressurizing valve and pressurizing the differential pressure water electrolysis device upon starting operations;
    determining an amount a water level will rise during the opening of the depressurization valve as a depressurization rise amount; and
    determining an amount a water level will rise during initial pressurization upon starting operations of the differential pressure water electrolysis device until a point where the water level reaches a peak value as a pressurization rise amount;
    wherein, in the switching of the permissible water level upper limit value, a value is obtained by subtracting both the depressurization rise amount and pressurization rise amount from the reference water level, and the value thus obtained is set as the depressurization reference water level.

3. The control method according to claim 1, further comprising:
    determining temperature when depressurizing;
    wherein the higher the temperature is, the higher the depressurization reference water level is set.

4. A control method of a differential pressure water electrolysis system during depressurizing, the differential pressure water electrolysis system including
    a differential pressure water electrolysis device configured to perform electrolysis of water and generate oxygen at the anode side, while generating hydrogen at the cathode side at a higher pressure than that of the oxygen,
    a gas-liquid separator configured to perform gas-liquid separation of hydrogen derived from the differential pressure water electrolysis device,
    a pressure loss part having an orifice or fine tube, the pressure loss part being disposed on a discharge tube to discharge liquid water stored in the gas-liquid separator and which causes a set amount of the liquid water to flow by providing pressure loss,
    an open/close valve to open and close the discharge tube, and
    a depressurization valve provided on a depressurizing tube to reduce pressure at the cathode side of the differential pressure water electrolysis device, the depressurization valve being opened when depressurizing,
    the control method comprising:
    setting a reference water level of the gas-liquid separator for normal operations at which the liquid water stored in the gas-liquid separator is discharged to the discharge tube;
    setting a depressurization reference water level, which is a lower water level than the reference water level, at which the liquid water stored in the gas-liquid separator is discharged to the discharge tube upon depressurizing;
    opening the depressurization valve to reduce pressure at the cathode side after operation of the differential pressure water electrolysis device has been stopped; and
    switching a permissible water level upper limit value at which the open/close valve is opened from the reference water level to the depressurization reference water level when the depressurization valve is opened.

5. The control method according to claim 4, further comprising:
    closing the depressurizing valve and pressurizing the differential pressure water electrolysis device upon starting operations;
    determining an amount a water level will rise during the opening of the depressurization valve as a depressurization rise amount; and
    determining an amount a water level will rise during initial pressurization upon starting operations of the differential pressure water electrolysis device until a point where the water level reaches a peak value as a pressurization rise amount;

wherein, in the switching of the permissible water level upper limit value, a value is obtained by subtracting both the depressurization rise amount and pressurization rise amount from the reference water level, and the value thus obtained is set as the depressurization reference water level.

6. The control method according to claim 4, further comprising:

determining temperature upon depressurizing;

wherein the higher the temperature is, the higher the depressurization reference water level is set.

7. A control method for a differential pressure water electrolysis system during depressurizing, comprising:

providing a differential pressure water electrolysis device to perform electrolysis of water and generate oxygen at the anode side, while generating hydrogen at the cathode side at a higher pressure than that of the oxygen, and a gas-liquid separator configured to perform gas-liquid separation of hydrogen from the differential pressure water electrolysis device;

setting a reference water level of the gas-liquid separator for normal operations at which a liquid water stored in the gas-liquid separator is discharged to a discharge tube;

setting a depressurization reference water level, which is a lower water level than the reference water level, at which the liquid water stored in the gas-liquid separator is discharged to the discharge tube;

opening a depressurization valve on a depressurization tube to reduce pressure at the cathode side after operation of the differential pressure water electrolysis device has been stopped; and switching a permissible water level upper limit value, at which an open/close valve in the discharge tube is opened, from the reference water level to the depressurization reference water level when the depressurization valve is opened.

8. The control method according to claim 7, further comprising:

closing the depressurizing valve and pressurizing the differential pressure water electrolysis device upon starting operations;

determining an amount a water level will rise during the opening of the depressurization valve as a depressurization rise amount; and determining an amount a water level will rise during initial pressurization upon starting operations of the differential pressure water electrolysis device until a point where the water level peak reaches a peak value as a pressurization rise amount;

wherein, in the switching of the permissible water level upper limit value, a value is obtained by subtracting both the depressurization rise amount and pressurization rise amount from the reference water level, and the value thus obtained is set as the depressurization reference water level.

9. The control method according to claim 7, further comprising:

determining temperature when depressurizing;

wherein the higher the temperature is, the higher the depressurization reference water level is set.

* * * * *